Aug. 21, 1934.  W. BAUERSFELD  1,971,061
MICROSCOPE
Filed March 24, 1934  2 Sheets-Sheet 1

Inventor:
Walther Bauersfeld.

Aug. 21, 1934.   W. BAUERSFELD   1,971,061
MICROSCOPE
Filed March 24, 1934   2 Sheets-Sheet 2

Inventor:
Walter Bauersfeld.

Patented Aug. 21, 1934

1,971,061

UNITED STATES PATENT OFFICE 1,971,061

MICROSCOPE

Walther Bauersfeld, Jena, Germany, assignor to the firm of Carl Zeiss, Jena, Germany Application March 24, 1934, Serial No. 717,227 In Germany March 27, 1933

3 Claims. (Cl. 88—39)

Applications have been filed in Germany, March 27, 1933 and Japan, July 19, 1933.

The usual microscopes are generally provided with an eye-piece tube into which different eye-pieces may be inserted alternately. With a view to avoiding the disadvantages inherent in changing the eye-pieces, the suggestion has been made to use a revolving ocular piece containing at least two eye-piece tubes. Using this ocular piece offers the advantage that the different eye-pieces generally required, and, eventually, a binocular tube attachment instead one of the eye-pieces, are always ready at disposal, a rotation of the ocular piece placing the desired eye-piece or the binocular tube attachment into the path of the imaging rays.

A revolving ocular piece is especially convenient when a microscope is concerned which has an inclined viewing direction and is provided with a reflecting system deflecting the imaging rays in the direction of the axis of the eye-piece in position for use. According to the invention, the instrument is so constructed that the axis of rotation of the ocular piece coincides with the optical axis of the microscope objective. When the microscope is equipped with an ocular piece having a plurality of objectives to be used alternately, the axis of rotation of the ocular piece is to correspond to the direction of the axis of the objective in position for use. The ocular piece is in this case a body of revolution whose axis coincides with that of the microscope and which is therefore of an especially simple construction. The reflecting system for deflecting the pencil of imaging rays into the viewing direction is conveniently provided in the stationary part of the ocular piece.

Figure 1:
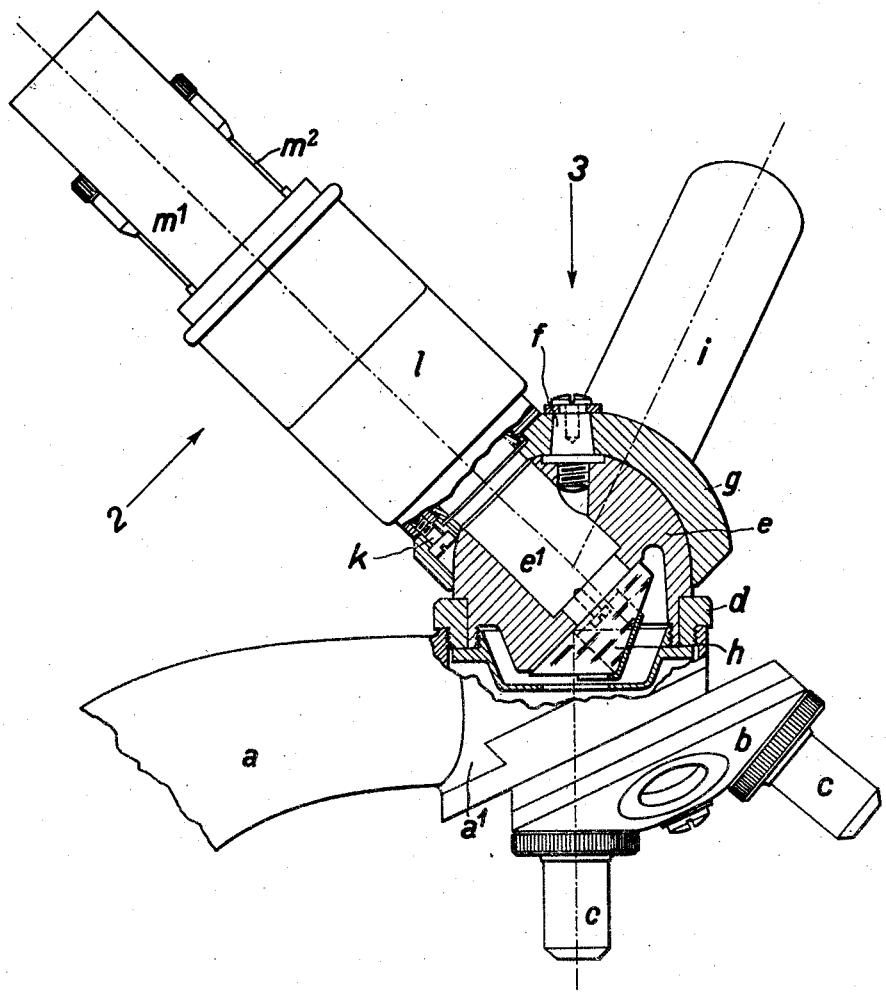
Figure 2:
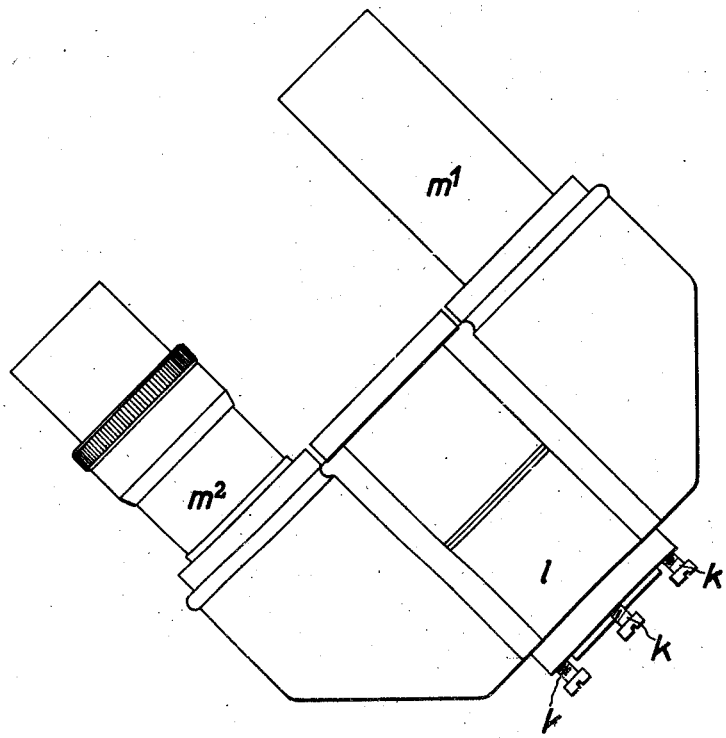
Figure 3:
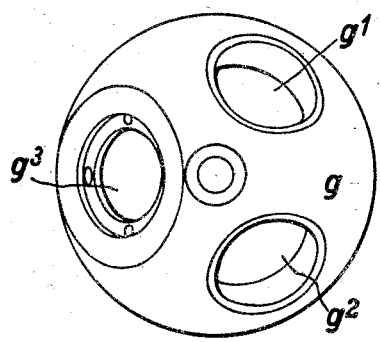

In the accompanying drawings, which represent a constructional example of the invention, Figure 1 shows the example in part-sectional elevation, and Figures 2 and 3 illustrate single parts of the example in top views as seen from the direction indicated by the arrows 2 and 3 in Figure 1.

The microscope stand, which may have any suitable form, is represented only by the upper part of its pillar bracket $a$. A revolving nose-piece $b$ for the microscope objective $c$ is attached in the known manner to the lower part of the head $a^1$ of the pillar bracket $a$. A revolving ocular piece for three eye-pieces is attached to the upper end of the head $a^1$ by means of a ring $d$. The said ocular piece consists of a stationary part $e$ and a part $g$ rotatable about a bolt $f$ fixed to the said stationary part $e$. The axis of the bolt $f$ coincides with the optical axis of the microscope objective $c$ in position for use. The stationary part $e$ has an inclined bore $e^1$. In front of the lower end of this bore $e^1$ is provided a reflecting prism $h$ whose reflecting surfaces are so inclined that the imaging rays emanating from the objective $c$ are deflected twice and directed into the bore $e^1$ in the direction of the axis of same. The rotatable part $g$ of the ocular piece (Figure 3) has three bores $g^1$, $g^2$ and $g^3$. Each of the bores $g^1$ and $g^2$ is adapted to receive an eye-piece tube $i$. Screws $k$ hold a binocular tube attachment (Figure 2) in the bore $g^3$. The binocular tube attachment consists in the known manner of a prism housing $l$ to which there are attached an eye-piece tube $m^1$, which may not be adjusted, and an adjustable eye-piece tube $m^2$.

The eye-pieces required for observing by means of the microscope are inserted into the ocular tubes $i$ and $m^1$, $m^2$. The objective and the eye-piece are chosen according to the desired magnification and given the correct positions for use by means of the revolving pieces $b$ and $g$. The axis of the eye-piece tube $i$ in position for use lies in the direction of the bore $e^1$. When observations are to be effected with both eyes, the ocular piece $g$ is rotated until the binocular tube attachment has assumed its position for use in front of the bore $e^1$. The microscope according to the invention is used in quite the same manner as any other microscope, the only difference being that the eye-pieces need not be removed from the microscope when they are to be changed.

I claim:

1. A microscope comprising a stand, at least one microscope objective, a revolving ocular piece consisting of a part rigidly connected to the stand and a part rotatable on the said stationary part about an axis, at least two eye-piece tubes mounted in the said rotatable part, and a reflecting system adapted to deflect the pencil of imaging rays emanating from the said objective into the direction of the eye-piece tube in position for use, the axis of rotation of the said rotatable part coinciding with the axis of the said objective.

2. A microscope according to claim 1, the said reflecting system being disposed in that part of the said ocular piece which is rigidly connected to the said stand.

3. A microscope comprising a stand, an objective changing device, at least two microscope objectives disposed in the said objective changing device, a revolving ocular piece consisting of a part rigidly connected to the stand and a part rotatable on the said stationary part about an axis, at least two eye-piece tubes mounted in the said rotatable part, and a reflecting system adapted to deflect the pencil of imaging rays emanating from the objective in position for use into the direction of the eye-piece tube in position for use, the axis of rotation of the said rotatable part coinciding with the axis of the objective in position for use.

WALTHER BAUERSFELD.